United States Patent [19]

Rosenberg et al.

[11] Patent Number: 5,142,485
[45] Date of Patent: Aug. 25, 1992

[54] TWO AXIS ACCELEROMETER

[75] Inventors: Jehuda Rosenberg, Kiryat Tivon; Patrick Bar-Avi, Kiryat Haim, both of Israel

[73] Assignee: The State of Israel, Ministry of Defence, Rafael Armament Development Authority, Israel

[21] Appl. No.: 553,244

[22] Filed: Jul. 16, 1990

[30] Foreign Application Priority Data

May 17, 1990 [IL] Israel .......................... 94421

[51] Int. Cl.⁵ ...................... G01C 19/02; G01P 15/02
[52] U.S. Cl. .................................. 364/566; 73/488; 73/495; 73/510; 74/5 F; 364/550
[58] Field of Search ............ 74/5 F, 5.22, 5.34, 74/5.6 A; 73/488, 493, 495, 504, 510, 514; 364/566, 550, 559, 453

[56] References Cited

U.S. PATENT DOCUMENTS

| | | | |
|---|---|---|---|
| 3,540,293 | 11/1970 | Cochin | 73/504 X |
| 4,122,689 | 10/1978 | Beardmore | 74/5 F X |
| 4,326,428 | 4/1982 | Bostwick et al. | 74/5 F |
| 4,397,185 | 8/1983 | Craig et al. | 73/504 |
| 4,715,227 | 12/1987 | Pittman | 73/504 |
| 4,930,365 | 6/1990 | Porat et al. | 74/5 F X |

Primary Examiner—Parshotam S. Lall
Assistant Examiner—E. Pipala
Attorney, Agent, or Firm—Steinberg & Raskin

[57] ABSTRACT

A new two-axis accelerometer comprising a rotating body linked to the motor rotor via a flexure zone. In a first type the rotating mass is concentrated and the flexure zone permits the rotating mass to perform a transversal parallel shift. In a second type the rotating body is an inertia rotor and the flexure zone is an extension of the rotor shaft that embodies a flexible portion. In either type the rotating body/flexure zone combination has two degrees of flexing freedom with two different flexure coefficients in two mutually perpendicular directions both normal to the electric motor shaft. The accelerometer further comprises a deflector shaft coaxial with the rotor shaft and extending beyond the rotating body and associated with electro-optical measuring means and processor means for measuring linear acceleration components in said two mutually perpendicular directions. In one of its aspects the two axis accelerometer in accordance with the invention measures only two perpendicular components of the acceleration of a body to which it is attached. By another aspect the two axis accelerometer according to the invention is a multisensor being at one and the same time a two-axis angular rate gyroscope and a two axis accelerometer. By yet another aspect of the invention there is provided a multisensor inertial measurement unit (MIMU) serving for the simultaneous measurement of three angular velocity and three linear acceleration components.

19 Claims, 12 Drawing Sheets

TWO AXIS ACCELEROMETER

FIELD OF THE INVENTION

The present invention relates to a new two-axis accelerometer. In one of its aspects the two axis accelerometer in accordance with the invention measures only two perpendicular components of the acceleration of a body to which it is attached. By another aspect the two axis accelerometer according to the invention is a multisensor being at one and the same time a two-axis angular rate gyroscope and a two axis accelerometer. By yet another aspect of the invention there is provided a multisensor inertial measurement unit (MIMU) serving for the simultaneous measurement of three angular velocity and three linear acceleration components.

BACKGROUND OF THE INVENTION

In U.S. Pat. No. 4,930,365, whose disclosure is hereby incorporated by reference, there is described a two axis rate gyroscope of the kind comprising an electric motor driven inertia rotor that is distinct from the motor rotor, which inertia rotor is keyed on a portion of the electric motor shaft that comprises a flexible part constituting a flexure shaft adapted to flex upon precession of the inertia rotor in consequence of an angular velocity input around either of two axes normal to each other and both normal to the rotor spin axis; the shaft further comprising an end portion extending beyond the inertia rotor in the direction away from the electric motor constituting a deflector; electro-optical measuring means being provided in association with said deflector for detecting any deflection thereof.

The present invention is based on the suprising realisation that precession of the inertia rotor in a gymballess, two axis rate gyroscope of the kind specified occurs also upon linear acceleration and that the resulting deflection of said deflector can be correlated to the linear acceleration in two axes perpendicular to the shaft provided that the flexure shaft inertia rotor assembly has two degrees of freedom with two different flexure coefficients in two mutually perpendicular directions both normal to the shaft. These directions will be referred to herein as "axis 2" and "axis 3".

It has furthermore been found in accordance with the present invention that when in a gyroscope of the kind specified the inertia rotor is replaced by a concentrated mass body, i.e. a body of low volume, linked to the motor shaft by a flexure zone permitting a transversal parallel shift of said concentrated mass body, there results an apparatus in which linear acceleration brings about such transversal parallel shift.

Based on these findings the invention provides a two-axis accelerometer comprising an electric motor driven rotating body that is distinct from the motor rotor and linked to the latter via a flexure zone to form a rotating body/flexure zone combination, which combination is selected from the group consisting of type (i) and type (ii) combinations, said type (i) combination comprising a concentrated mass in combination with a flexure zone of a kind that permits the rotating body to perform a transversal parallel shift, and said type (ii) combination comprising an inertia rotor in combination with an extension of the electric motor shaft that embodies a flexible portion constituting said flexure zone; which type (i) and type (ii) rotating combinations each have two degrees of flexing freedom with two different flexure coefficients in two mutually perpendicular directions both normal to the electric motor rotor shaft; there being provided a deflector shaft coaxial with the rotor shaft and extending beyond the rotating body in a direction away from the electric motor, and in association with said deflector shaft electro-optical measuring means and processor means for measuring linear acceleration components in said two mutually perpendicular directions.

When the rotating body has a concentrated mass, the flexure zone that permits transversal parallel shift of the body may, for example, be in the form of a plurality of peripherally arranged flexure rods.

In the following, the assembly of a flexure zone, a rotating body, a deflector shaft, electro-optical measuring means and processor means will occasionally be referred to as "deflector assembly". A deflector assembly with a rotating body/flexure zone combination of type (i) above will be referred to as "deflector assembly of the first kind" and a rotating body/flexure zone combination of type (ii) above will be referred to as "deflector assembly of the second kind".

Similar as in U.S. Pat. No. 4,930,365 the terms "axisymmetric" and "asymmetric" are used herein in relation to the geometry of the flexure zone and the inertia rotor in a gyroscope according to the invention. The term "axisymmetric" is used in its conventional meaning to denote a body that is symmetrical all around a central axis. The term "asymmetric" is used in respect of bodies that are not axisymmetric but which may still be symmetric with respect to one or more planes extending through a central axis.

Thus, an accelerometer according to the invention may exist in either of two modes. By one mode, to be referred to as "accelerometer of the first kind", the apparatus has a deflector assembly of the first kind. By another mode, to be referred to as "accelerometer of the second kind", the apparatus has a deflector assembly of the second kind.

In its simplest form the apparatus according to the invention is exclusively an accelerometer and in such an embodiment one set of electro-optical measuring means in association with one set of processor means is sufficient. Where such an apparatus has a deflector assembly of the first kind, the performance of the deflector can be expressed by the following algorithmic expression:

$$x_2 = -a_2\alpha_1 + a_2(a_2 \cos 2nt + a_3 \sin 2nt) \qquad \text{I}$$

where:

$a_2$ and $a_3$ are the acceleration components at the two mutually perpendicular axes 2 and 3;

$\alpha_1$ and $\alpha_2$ are constants depending on the flexure coefficients in these two directions, the rotor mass and the speed of rotation;

n is the motor speed; and $x_2$ is the deflection component in axis 2, and the processor means are designed to resolve this algorithmic expression.

Where such an apparatus has a deflector assembly of the second kind, an asymmetric inertia rotor having three different principle moments of inertia is used in association with an asymmetric flexure shaft having two angular flexure coefficients in two perpendicular directions. Due to acceleration in a plane perpendicular to the motor shaft the rotor performs angular movements composed of constant angular bending and bending vibration at frequency twice the rotating speed. The performance of the deflector can in this case be expressed by the following algorithmic expressions:

$$\theta_2 = -\alpha_1 a_2 + \alpha_2 a_2 \cos(2nt) - \alpha_2 a_3 \sin(2nt) \qquad \text{II}$$

where $a_2$ and $a_3$ are the acceleration components at the perpendicular axes 2 and 3;

$\alpha_1$, $\alpha_2$ are constants depending on the flexure coefficients in these two directions, the inertia properties of the inertia rotor, the motor speed and the position of the centre of the rotor mass relative to the flexure zone;

n is the rotor speed; and $\theta_2$ is the angular deflection of the inertia rotor in axis 2, and the processor means are designed to resolve this algorithmic expression.

In the above algorithm the angular deflection $\theta_2$ will in addition to the acceleration be also influenced by applied angular velocity. However, by appropriate selection of the parameters (i.e. the inertia and flexure properties as well as the speed of rotation) it is possible to cancel the influence of the angular velocity and in consequence, by measuring $\theta_2$ it is possible to determine both $a_2$ and $a_3$.

The above algorithmic expressions I and II each have a DC component resulting from the expression $a$, $a$ and an AC component embodying the expressions cos 2nt and sin 2nt.

An accelerometer according to the invention may be designed as a multisensor adapted to measure at one and the same time both linear acceleration components and angular velocities in axes 2 and 3. In accordance with one embodiment of such a multisensor the apparatus is fitted with a first deflector assembly at one end dedicated to measuring linear acceleration, and with a second deflector assembly at the opposite end dedicated to measuring angular velocities.

In said first deflector assembly dedicated to measuring linear acceleration the accelerometer assembly may be either of the first kind whose performance is governed by the above algorithmic expression I, or of the second kind whose performance is governed by the above algorithmic expression II.

In accordance with another embodiment of a multisensor according to the invention there is provided one single deflector assembly with one single inertia rotor, designed for measuring both the linear acceleration components and the angular rate in said axes 2 and 3.

By one modification of such an embodiment the inertia rotor is asymmetric and the flexure shaft is symmetric, and in this case the performance is governed by the following algorithmic expressions:

$$\theta_2 = -\alpha_1 \omega_3 + \alpha_2 a_2 + \alpha_3 \omega_3 \cos(2nt) - \alpha_3 \omega_2 \sin(2nt)$$

$$\theta_3 = \alpha_1 \omega_2 - \alpha_2 a_3 + \alpha_3 \omega_2 \cos(2nt) - \alpha_3 \omega_3 \sin(2nt) \qquad \text{III}$$

where:

$a_2$, $a_3$, n and $\theta_2$, are as defined in relation to the algorithmic expressions II, $\theta_3$ is the angular deflection of the inertia rotor in axis 3 and $\omega_2$ and $\omega_3$ are the angular velocities in axes 2 and 3 and the processor means are designed to resolve these algorithmic expressions. From the AC components of the above algorithmic expression III the signal processing unit yields the angular rate component $\omega_2$, $\omega_3$ and from the DC components the signal processing unit yields the linear acceleration components $a_2$ and $a_3$.

By another modification of a multisensor according to the invention with one single deflector assembly, both the inertia rotor and flexure shaft are asymmetric, the performance is governed by the following algorithmic expressions:

$$\theta_2 = -\alpha_1 \omega_3 + \alpha_2 a_2 \cos(2nt) - \alpha_3 a_3 \sin(2nt)$$

$$\theta_3 = \alpha_1 \omega_2 + \alpha_2 a_3 \cos(2nt) + \alpha_3 a_2 \sin(2nt) \qquad \text{IV}$$

where $\alpha_1$, $\alpha_2$, $\alpha_3$, $a_2$, $a_3$, $\omega_2$, $\omega_3$, n and $\theta_2$, $\theta_3$ are the same as before and the processor means are designed to resolve these algorithmic expressions.

In this modification, similar as in the modification that operates on the basis of the algorithmic expressions III, the vibrational movements at 2 n frequency (AC-components) are separated from the quasistatic components (DC). However, as distinct from the previous modification, in this modification the signal processing means yields the linear acceleration components $a_2$ and $a_3$ from reading the AC-components, while the angular rate $\omega_2$ and $\omega_3$ are obtained from the DC-components.

By yet another modification of a multisensor according to the invention with a single deflector assembly in which the inertia rotor is symmetric and the flexure shaft is asymmetric, and the performance of the deflector is governed by the following algorithmic expression:

$$\theta_2 = -\alpha_1 \omega_3 + \alpha_2 a_2 + (\alpha_3 \omega_3 + \alpha_4 a_2) \cos(2nt) - (\alpha_3 \omega_2 + \alpha_4 a_3) \sin(2nt)$$

$$\theta_3 = \alpha_1 \omega_2 - \alpha_2 a_3 + (\alpha_3 \omega_2 + \alpha_4 a_3) \cos(2nt) + (\alpha_3 \omega_3 + \alpha_4 a_2) \sin(2nt) \qquad \text{V}$$

where:

$\alpha_1$, $\alpha_2$, $\alpha_3$ and $\alpha_4$ are constants depending on the rotary inertia properties, the flexure shaft constants and the position of the rotor center of mass and $a_2$, $a_3$, $\omega_2$, $\omega_3$, n and $\theta_2$, $\theta_3$ are as before. In principle the operation in this case is similar to the modification governed by the algorithmic expressions IV above, the processor means being designed to resolve the algorithmic expressions V.

In accelerometers and multisensors according to the invention all signals are measured with a non-rotating and thus non-abrasive measuring system. Against this, known multisensors, e.g. those manufactured by Plessey Electronic Systems Corporation (previously Singer Kearfott), the signals are measured by a rotary system which comprises piezoelectric beams attached to a rotor and rotating with it. The piezoelectric beams yield electric signal due to an input angular rate or linear acceleration. The electric signals are transferred through slip-rings to a signal processing unit and the system is intrinsically abrasive.

DESCRIPTION OF THE DRAWINGS

For better understanding the invention will now be described, by way of example only, with reference to the annexed drawings without being limited thereto. In the drawings.

DESCRIPTION OF SPECIFIC EMBODIMENTS

Figure 1:
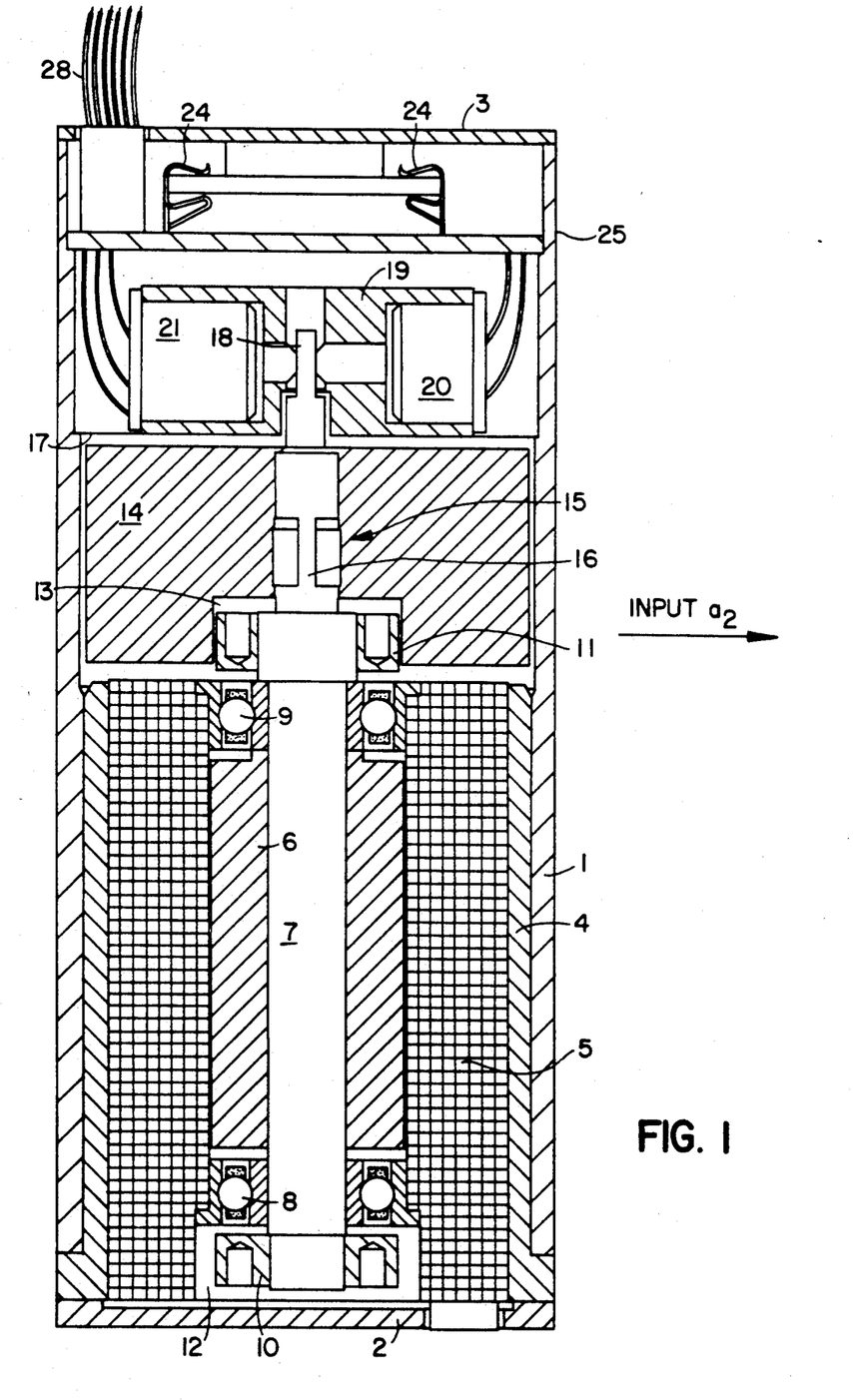
FIG. 1 is a diagrammatic cross-section of an accelerometer according to invention.
Figure 2:
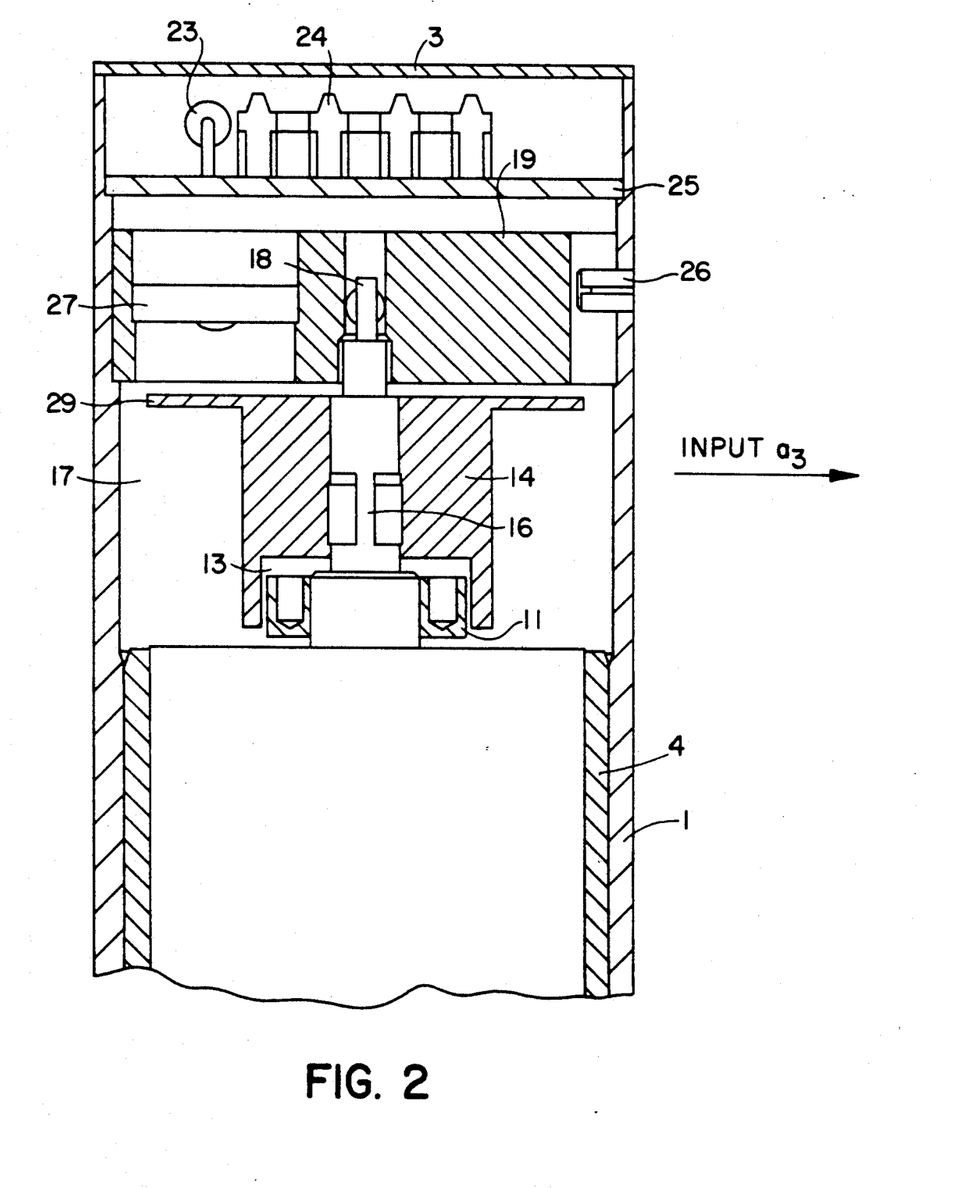
FIG. 2 is a fragmentary diagrammatic axial section of the accelerometer of FIG. 1 in a plane normal to the section plane of FIG. 1.

The accelerometer according to the invention shown in FIGS. 1 and 2 is of a similar mechanical design as the two axes angular rate gyroscope described in U.S. Pat. No. 4,930,365, comprising however, processor means designed in accordance with the teachings of the present invention. As shown, the accelerometer comprises a casing 1 having end plates 2 and 3 within which there is mounted by means of an adaptor 4 an electric hysteresis motor comprising a stator 5 and a rotor (hysteresis ring) 6. The rotor 6 is keyed on a shaft 7 mounted on a pair of bearings 8 and 9. Also keyed on shaft 7 are two balancing discs 10 and 11 of which the former is freely rotatable within a cavity 12 while the latter fits in a tight fit within cavity 13 of an inertia rotor 14, the distance of disc 11 from the end wall of cavity 13 being adjustable as may be required for proper functioning. A shaft portion 15 extending beyond the balancing disc 11 comprises a flexure zone 16. The inertia rotor 14 of the gyroscope of FIGS. 1 and 2 is of the asymmetric type and fits freely into a rotor chamber 17 and rotor 14 is keyed on shaft portion 15 so as to be directly rotatable by the electric rotor 6.

Extending beyond inertia rotor 14 is a stepped shaft portion whose terminal portion 18 serves as deflector in a non-contacting measuring arrangement designed for detecting any bending of flexure zone 16 in consequence of any precession of the inertia rotor 14 due to an acceleration input in either of two perpendicular axes both normal to the axis of rotation of the inertia rotor 14.

Figure 3A:
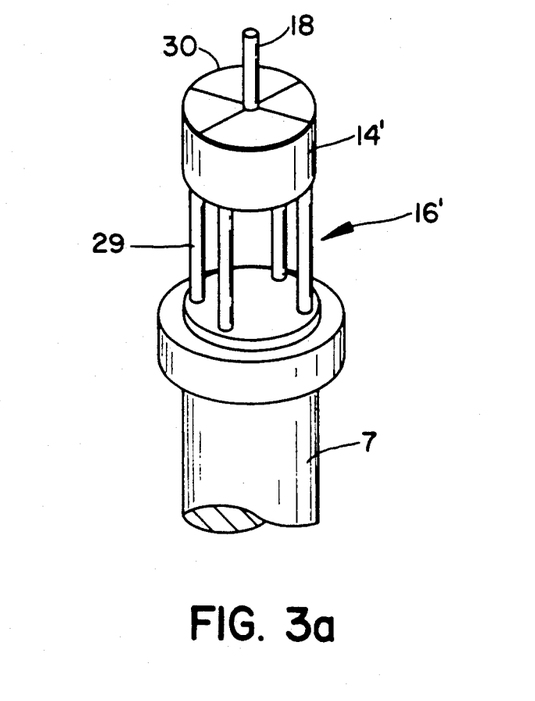
FIGS. 3a and 3b are diagrammatic perspective views of one embodiment of a flexure zone-rotating mass combination in accordance with one embodiment of the invention, shown in non-deflected and deflected position respectively.
Figure 3B:
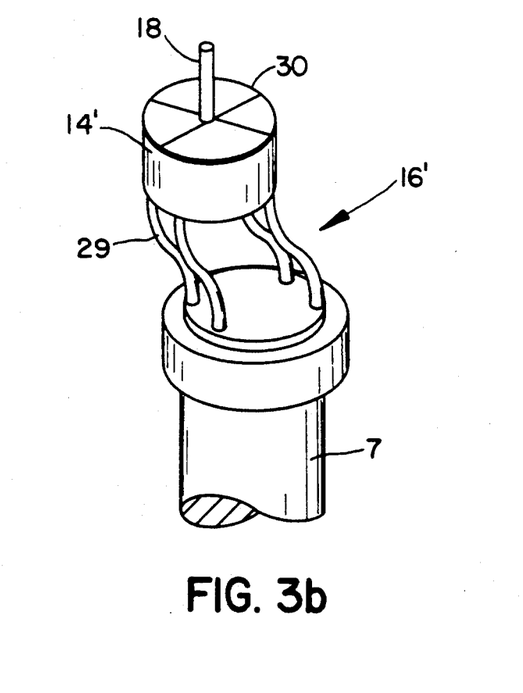

Attention is now directed to FIGS. 3a and 3b which show one embodiment of a rotating body/flexure zone combination of type (i) for use in an accelerometer according to the invention having a deflector assembly of the first kind. As shown, the rotary body 14' in this embodiment is a concentrated mass axisymmetric body whose diameter is about the same as that of the electric motor shaft 7, and the flexure zone 16' consists of four peripheral flexure rods 29 which in the operative state of FIG. 3b bring about a parallel shift of the inertia rotor 14' by a distance X. Rotor 14' bears a top plate 30 with black and white fields which serves for creating reference signals for the electro-optic measuring system.

Figure 4A:
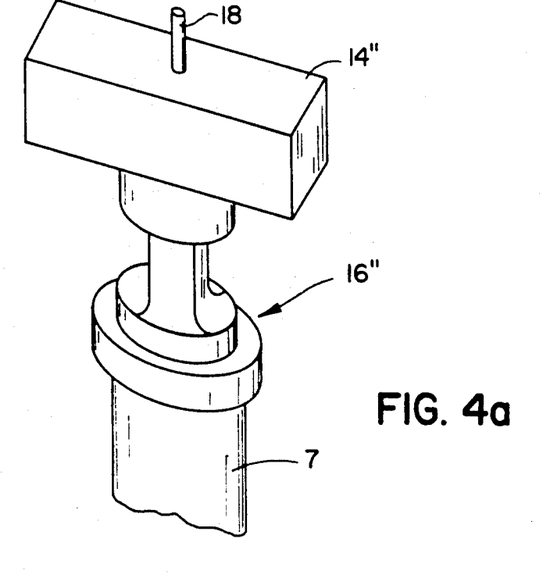
FIGS. 4a and 4b are similar diagrammatic perspective views of another embodiment of a flexure zone-inertia rotor combination for use in an accelerometer according to the invention.
Figure 4B:
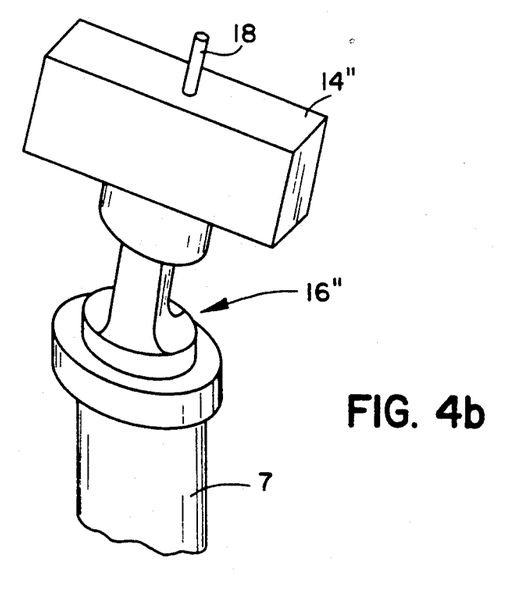

The rotating body/flexure zone combination of FIGS. 4a and 4b is of type (ii). Here the inertia rotor 14" is asymmetric and flexure zone 16" is a single, asymmetric flexure shaft with different flexure coefficients in the two mutually perpendicular directions in which the linear acceleration components are to be measured. Here too the rotor 14" comprises a top plate with black and white fields which, however is not shown.

Figure 5A:
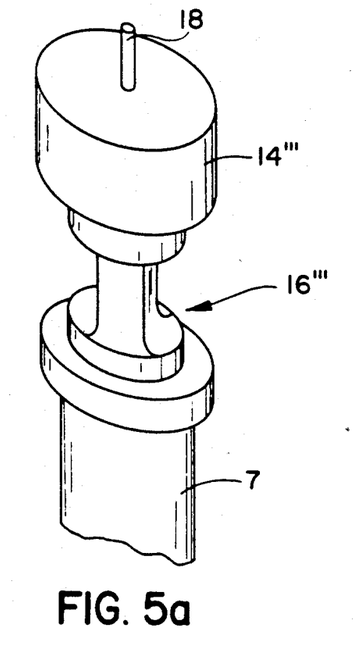
FIGS. 5a and 5b are similar diagrammatic perspective views of yet another embodiment of a flexure zone-inertia rotor combination for use in an accelerometer according to the present invention.
Figure 5B:
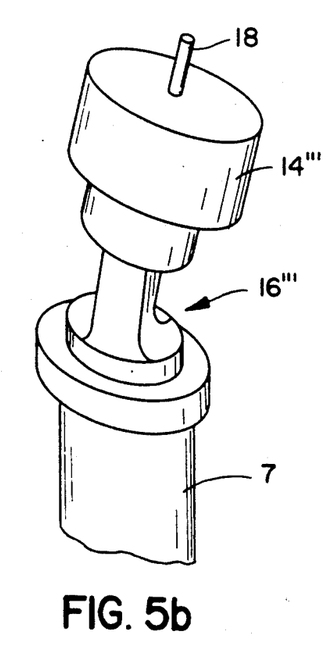

The rotating body/flexure zone combination of FIGS. 5a and 5b is also of type (ii). The inertia rotor 14''' is again axisymmetric while the flexure shaft 16''' is asymmetric with flexure constants as specified. Here again rotor 14''' carries a top plate with black and white fields (not shown) similar as in the embodiment of FIGS. 3a and 3b.

The flexure zone-inertia rotor combinations of FIGS. 4a, 4b is suitable for use in accelerometers according to the invention that are of the second kind.

Figure 6:
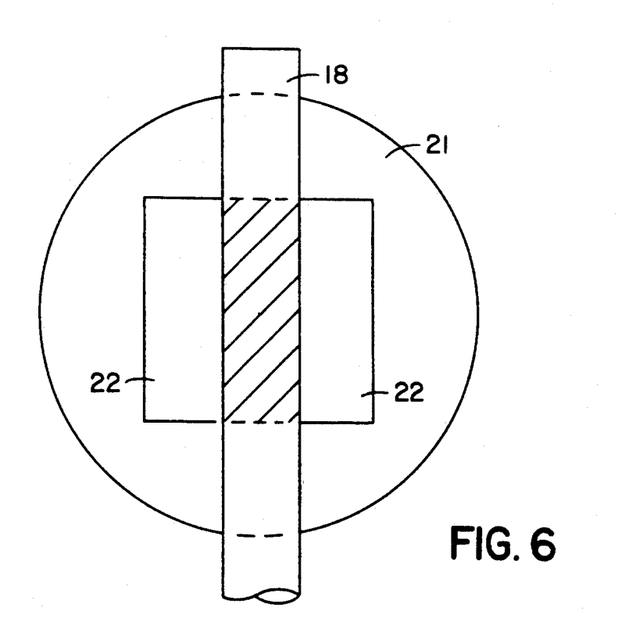
FIG. 6 is a diagrammatic illustration drawn to larger scale of electro-optical means for detection of deflections of the deflector in the accelerometer of FIGS. 1 and 2.

Attention is now again directed to FIGS. 1 and 2 and also to FIG. 6. As shown, deflector 18 is located within an optical pick-off 19 comprising a light source 20 and an electro-optic sensor 21 which may, for example, be a photodiode. As shown in FIG. 6, the electro-optic sensor comprises two juxtaposed and contiguous sensing elements 22 which are illuminated by the light source 20 but for a shade cast by deflector 18. In the absence of any acceleration the flexure shaft 16 is undeflected and deflector 18 is in its normal, fully upright position shown in FIG. 6 in which the partition of the shaded area between sensing elements 22 is even. In case of a deflection the shaded area moves left or right whereby the illumination of the two sensing elements 22 and the partition of the shaded area between them becomes uneven. In consequence, the electro-optic sensor 21 produces an output that is fed into and processed by an electronic processor device designed so as to operate by either of algorithms I and II herein and comprising a preamplifier 23, a card bearing printed circuits 24, and a supporting board 25 which also carries a printed circuit for connecting the optical components.

The optical pick-off is held in a tight fit, and, if desired, also by a suitable binder and the angular position is fixed by means of a pin 26 shown in FIG. 2. As further shown in FIG. 2 the pick-off 19 comprises a reference sensor 27 with a light source and detector which in association with the top plate of inertia rotor 14 such as plate 30 in FIGS. 3a and 3b produces a reference signal by which it becomes possible that acceleration components input along two axes can be determined by measuring only one deflection.

The electric wires (not shown) for electric current supply to the electric motor pass through end plate 2 while the electric wires 28 for energizing the optic head 19 and the electronic circuitry thereof pass through end plate 3.

The inertia rotor 14 is located on shaft 7 in such a manner that transverse linear acceleration does affect the light partition between the sensing elements 22. Any acceleration input is translated by the accelerometer according to the invention into linear deflection of deflector 18 which causes a change of the light partition between the two sensing elements 22, the balancing disc 11 preventing excessive deflection.

Figure 7:
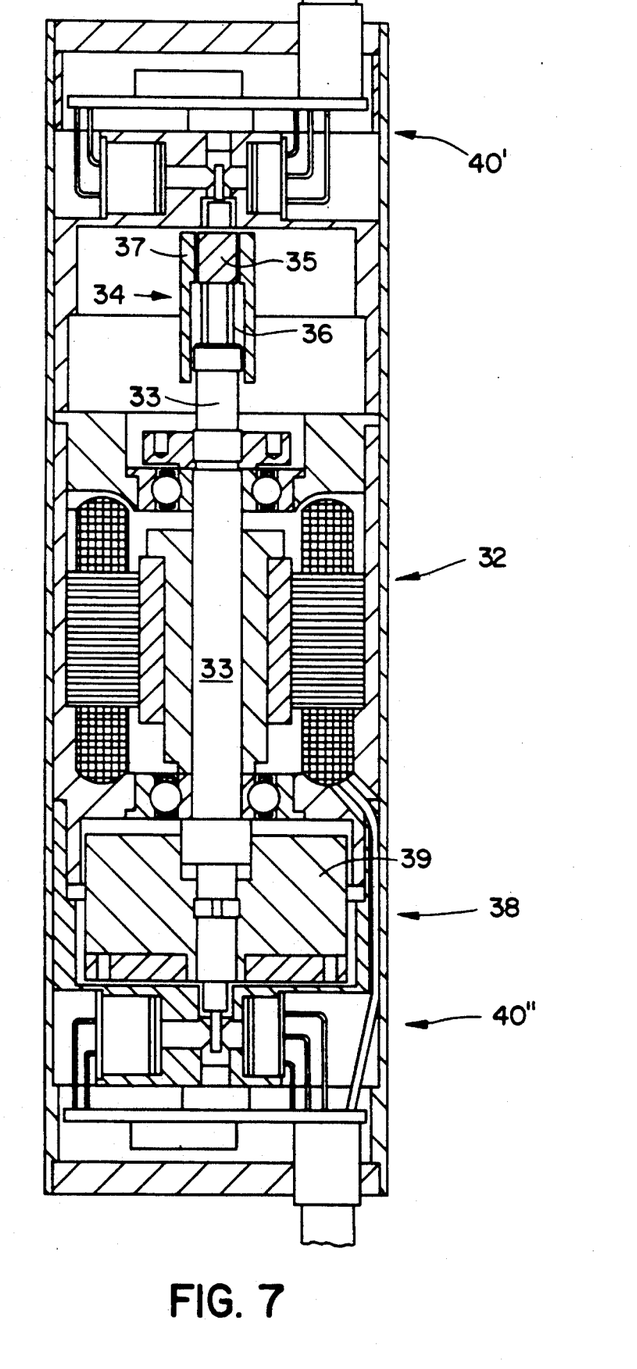
FIG. 7 is a diagrammatic axial section of one embodiment of a multisensor according to the invention.

Attention is now directed to FIG. 7 which is a diagrammatic axial section of one embodiment of a multisensor according to the invention having two distinct deflector assemblies at the two ends of the electric motor and an optical head associated with either of them. As shown, at one end of an electric motor 32 keyed on a motor shaft 33 there is keyed a first deflector assembly 34 of the first kind in which the rotating body is a concentrated mass 35 linked to motor shaft 33 by a plurality of peripherically arranged flexure rods 36 and surrounded by a limiter sleeve 37. This first deflector assembly embodies a rotating body/flexure zone combination of a design as shown in FIGS. 3a, 3b and is dedicated to measuring linear acceleration.

At the second end of electric motor 32 there is provided a second deflector assembly 38 of the second kind having an inertia rotor 39 and which is dedicated to measuring angular rates.

The deflector assemblies 34 and 38 are associated with pick-offs 40' and 40'', respectively.

If desired, in a multisensor of the kind shown in FIG. 7 both deflector assemblies may be of the second kind.

Figure 8:
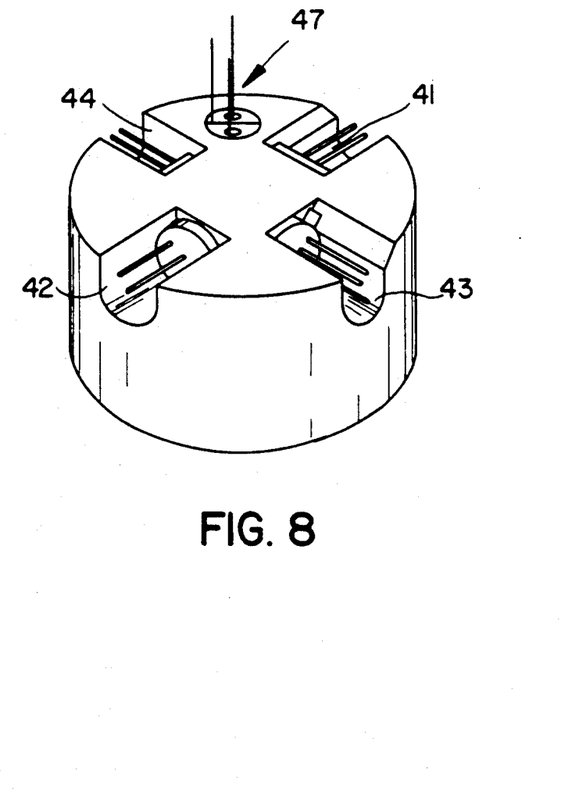
FIG. 8 is a perspective view of an electro-optic measuring system for use in another embodiment of a multisensor according to the invention comprising only one single flexure zone-inertia rotor combination.
Figure 9:
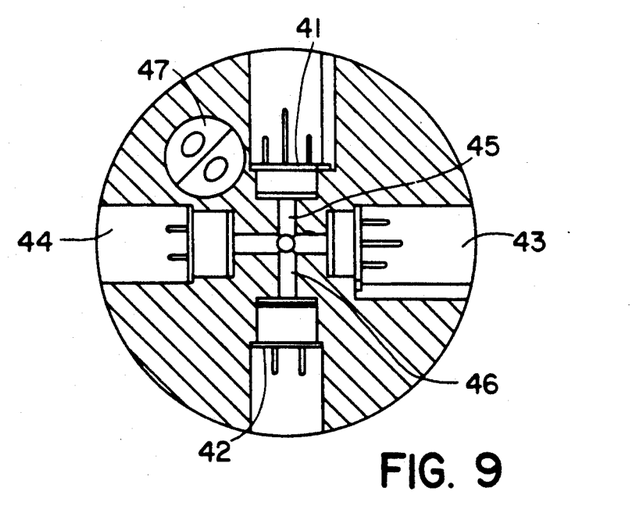
FIG. 9 is a cross-section of the electro-optic measuring system of FIG. 8.

By another embodiment of a multisensor according to the invention there is provided only one single deflector assembly of the second kind in association with a single optical pick-off having two pairs of electro-optical measuring means as shown in FIGS. 8 and 9. As shown, the measuring system comprises a first light source 41 with an associated first electro-optic sensor 42, a second light source 43 with an associated second electro-optic sensor 44; intersecting radial bores 45 and 46 which in their intersection accommodate the flexure shaft 18 of the apparatus (not shown in FIGS. 8 and 9); and a reference sensor 47 with light source and detector.

Each of the electro-optic sensors 42 and 44 is of a design similar to the one described hereinbefore with reference to FIG. 6, and likewise the reference sensor 47 with light source and detector is similar to reference sensor 27 in FIG. 2. This sensor cooperates with a top plate of the inertia rotor having black and white fields such as for example, top plate 30 of inertia rotor 14' in FIGS. 3a and 3b, to produce a reference signal by which it becomes possible that acceleration components along two axes and angular velocity inputs about the same two axes can be sensed by measuring only one deflection.

Figure 10:
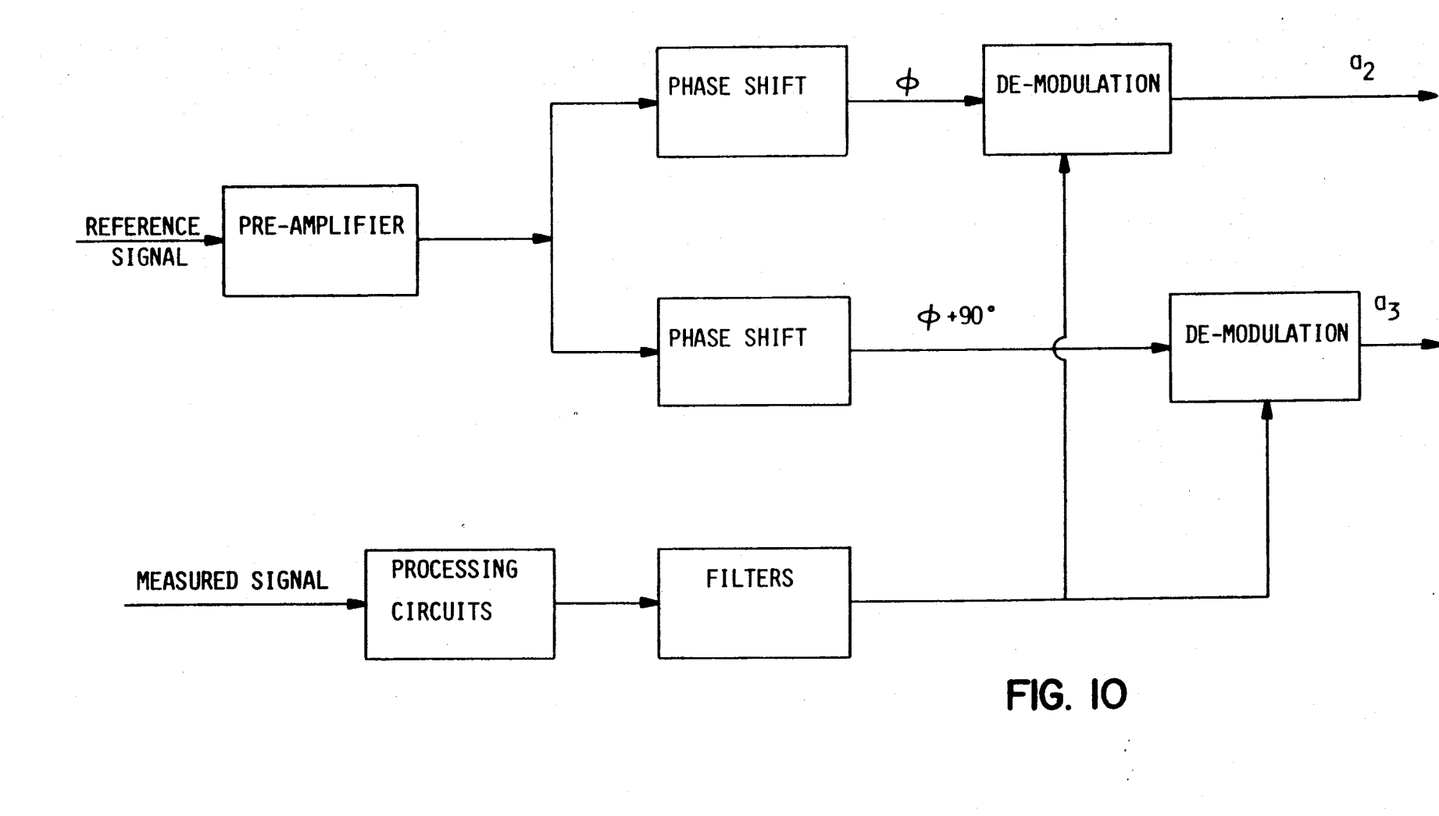
FIG. 10 is a block diagram of the electronic circuit used in processing the optical signals received in an accelerometer according to FIGS. 1 and 2 and programmed to operate by the algorithmic expression I or II.

The block diagram of FIG. 10 shows the manner in which the output signals $a_2$ and $a_3$ are obtained in an embodiment of an accelerometer according to the invention as shown in FIGS. 1 and 2, which serves for the measurement of linear accelerations only on the basis of either of the two algorithmic expressions I and II hereinabove. As seen, there are two inputs into the circuits, one being the angle signal produced by light source 20 and photodiode 21 (see FIGS. 1, 2 and 6) in consequence of the deflection of deflector 18 (FIGS. 1 and 2), and the other being a reference signal produced by reference sensor 27 in FIGS. 1 and 2, in conjunction with the inertia rotor according to any of the embodiments of FIGS. 3 to 5.

Figure 11:
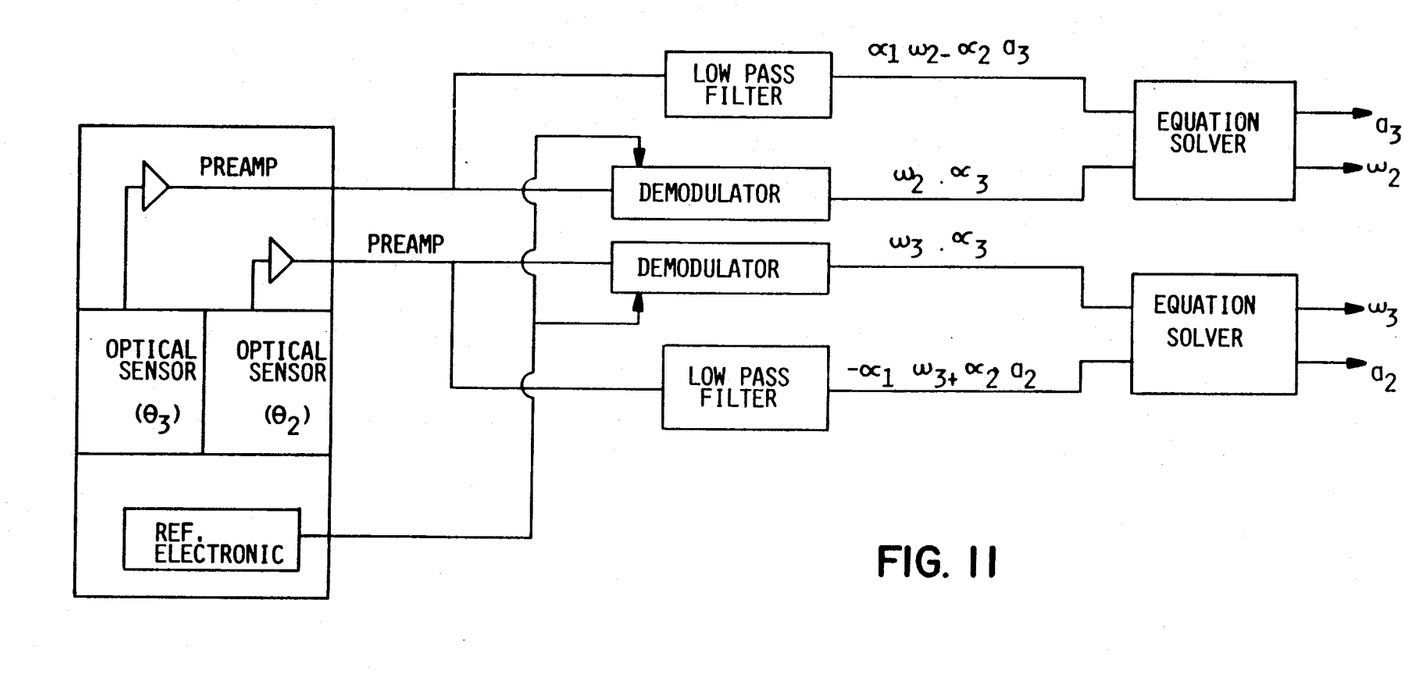
FIGS. 11, 12 and 13 are block diagrams of the electronic circuits used in processing the optical signals received in a multisensor according to the invention comprising one single flexure zone-inertia shaft combination and an electro-optic measuring system of the kind shown in FIGS. 8 and 9 and programmed to operate by the algorithmic expressions III, IV and V hereinbefore, respectively.
Figure 12:
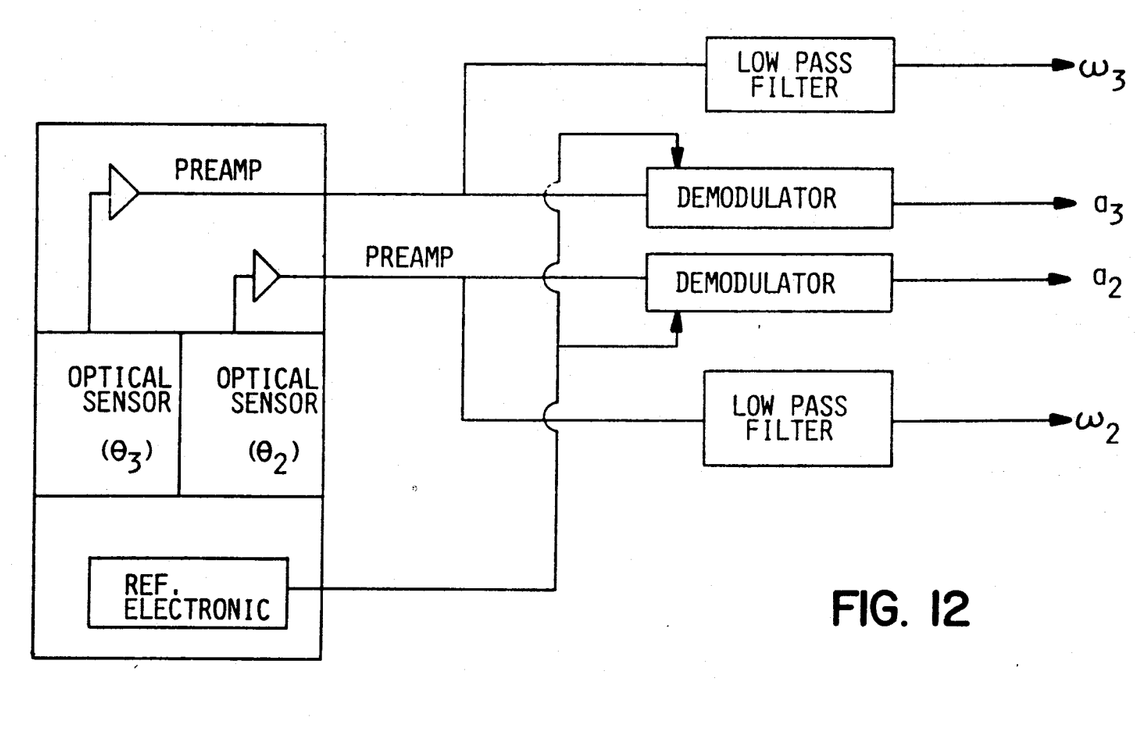
Figure 13:
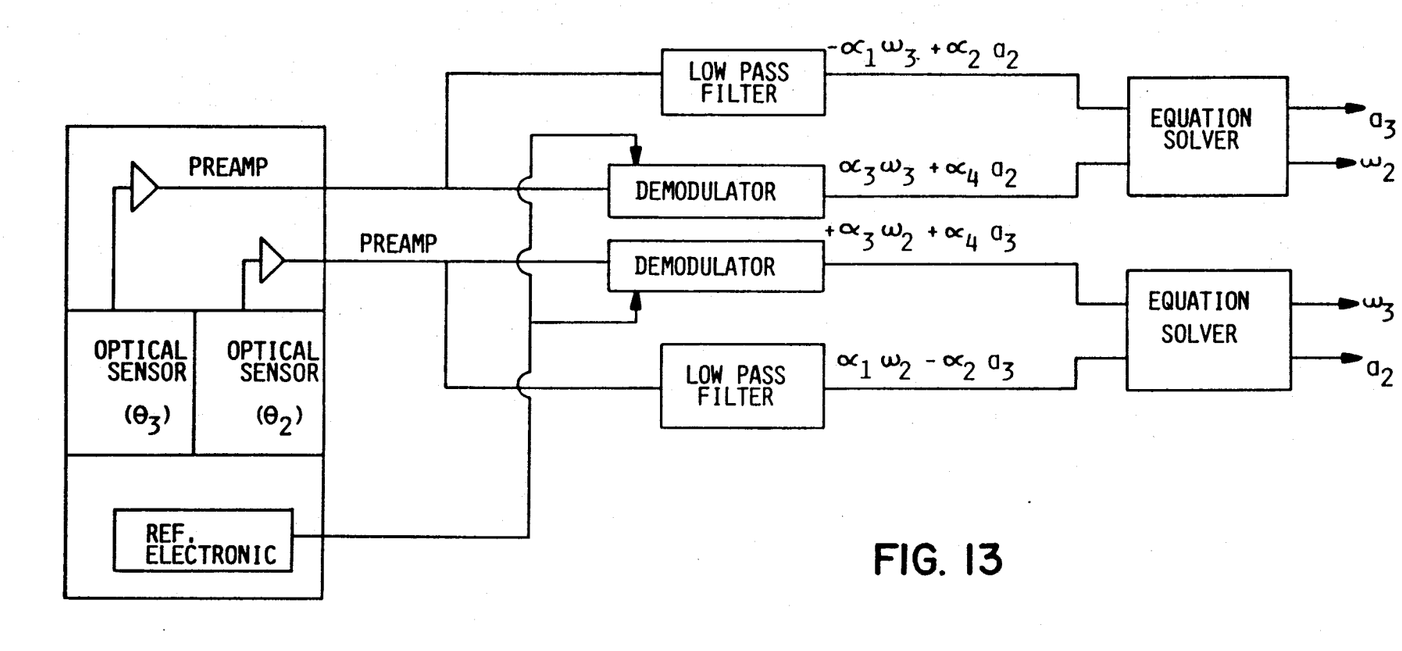

The block diagrams of FIGS. 11, 12 and 13 show three different embodiments of processor means in multisensors according to the invention designed to operate, respectively, on the basis of the algorithmic expressions III, IV and V herein. Thus, the block diagram of FIG. 11 operates on the basis of the algorithmic expressions III, that of FIG. 12 on the basis of the algorithmic expressions IV and that of FIG. 13 on the basis of the algorithmic expressions V. The mode of operation in each case is self-evident to a person versed in the art from the block diagrams themselves and the indications therein and no further explanations are required.

Figure 14:
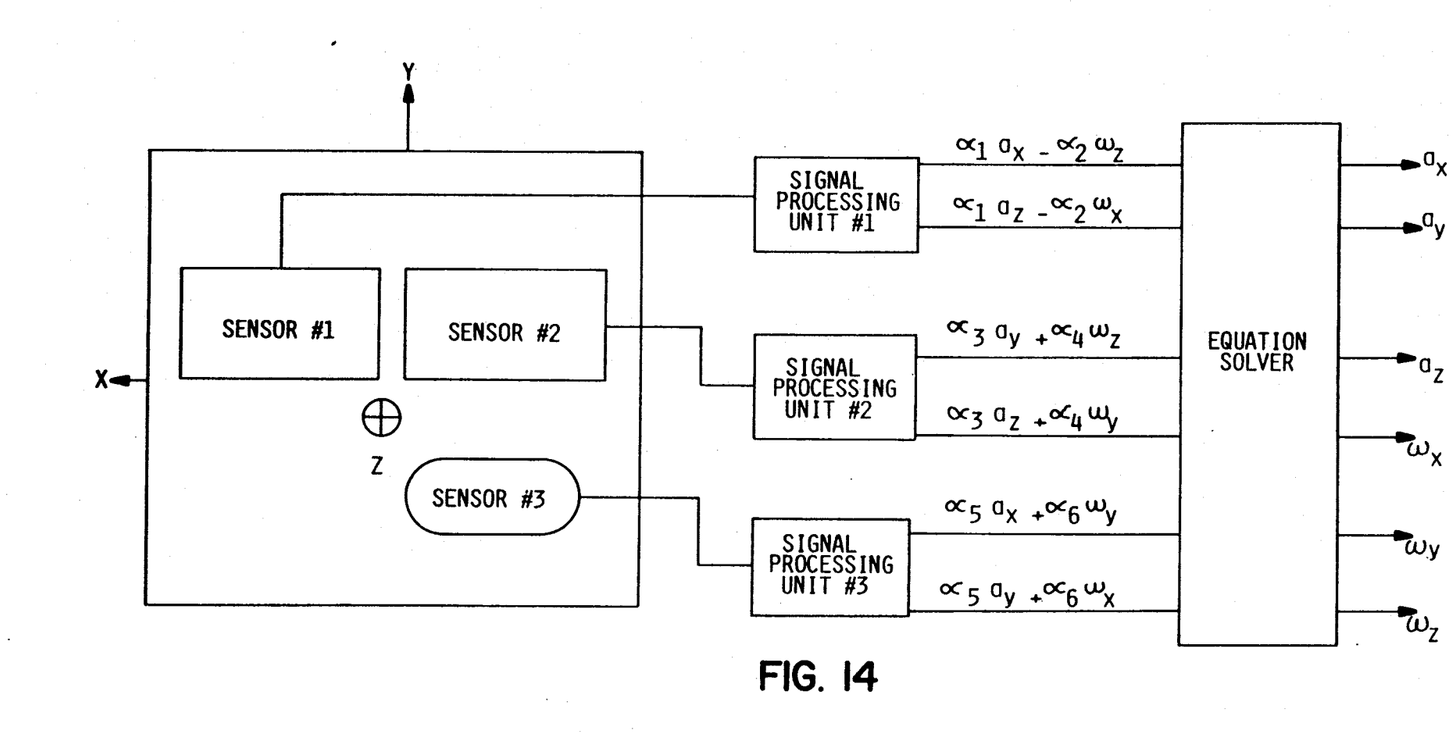
FIG. 14 is a block diagram of a multisensor inertial measurement unit embodying three sensors.

Attention is now directed to FIG. 14 which is a block diagram of a multisensor inertial measurement unit designed to measure linear acceleration components and angular rates along three mutually perpendicular axes X, Y and Z and embodying three sensors which may be described as "degenerated" multisensors according to the invention which sense indiscriminately linear accelerations and angular rates. The expression for the angular deflection, (using the AC component) of this combination is as follows:

$$\theta'_2 = (a^i{}_3\omega_3 + a^i{}_4 a_2) \cos(2nt) - (a^i{}_3\omega_2 + a^i{}_4 a_3) \sin(2nt) \qquad \text{VII}$$

where:

$a^i$ are constant parameters depending on the inertia properties of the rotors, flexure coefficients, positions of centre of masses of the rotors and the speeds of rotation and it is noted that the above algorithmic expression embodies only the sin (2nt) and cos (2nt) components which are the AC-components that are being measured in accordance with the present invention.

For the three sensors numbers 1, 2 and 3 altogether six equations with six unknowns are obtained and the solution is done by a microprocessor or an analogue unit. The various indications in FIG. 14 are self-evident to a person versed in the art and no further explanations are required.

We claim:

1. A two-axis accelerometer for measuring linear acceleration in two mutually perpendicular directions designated herein as axis 2 and axis 3 comprising an electric motor with rotor and rotor shaft that is normal to said axis 2 and axis 3, which electric motor drives a rotating body that is distinct from the motor rotor and linked to the latter via a flexure zone to form a rotating body/flexure zone combination, which combination is selected from the group consisting of type (i) and type (ii) combinations, said type (i) combination comprising a concentrated mass in combination with a flexure zone of a kind that permits the rotating body to perform a transversal parallel shift, and said type (ii) combination comprising an inertia rotor in combination with an extension of the electric motor shaft that embodies an asymmetric flexible portion constituting said flexure zone; which type (i) and type (ii) combinations each have two degrees to flexing freedom with two different flexure coefficients in two mutually perpendicular directions both normal to the electric motor rotor shaft; there being provided a deflector shaft coaxial with the rotor shaft and extending beyond the rotating body in a direction away from the electric motor, and in association with said deflector shaft electro-optical measuring means and processor means for measuring linear acceleration components in said two mutually perpendicular directions.

2. An accelerometer according to claim 1 referred to herein as type (i), wherein the rotating body has a concentrated mass and said flexure zone is a kind that permits the rotating body to perform a transversal parallel shift, the performance of the deflector shaft is expressed by the algorithmic expression $$x_2 = -a_2\alpha_1 + a_2(a_2 \cos 2nt + a_3 \sin 2nt)$$

where $a_2$ and $a_3$ are the acceleration components at the two mutually perpendicular axes 2 and 3; $\alpha_1$ and $\alpha_2$ are constants depending on the flexure coefficients in these two directions, the rotor mass and the speed of rotation; n is the motor speed; and $x_2$ is the deflection components in the axis 2, and the processor means are designed to resolve this algorithmic expression.

3. An accelerometer according to claim 2, wherein the flexure zone consists of a plurality of peripherically arranged flexure rods.

4. An accelerometer according to claim 1 referred to herein as type (ii) wherein the rotating body is an inertia rotor keyed on an extension of the electric motor rotor shaft that embodies a flexible portion constituting said flexure zone, the performance of the deflector shaft is expressed by the algorithmic expression $$\theta_2 = -\alpha_1 a_2 + a_2 a_2 \cos (2nt) - a_2 a_3 \sin (2nt)$$

where $a_2$ and $a_3$ are the acceleration components at the perpendicular axes 2 and 3; $\alpha_1, \alpha_2$ are constants depending on the flexure coefficients in these two directions, the inertia properties of the inertia rotor, the motor speed and the position of the center of the rotor mass relative to the flexure zone; n is the rotor speed; and $\theta_2$ is the angular deflection of the inertia rotor in axis 2;

and said processor means are designed to resolve the algorithmic expression.

5. An accelerometer according to claim 4, wherein the inertia rotor is asymmetric.

6. An accelerometer according to claim 1 designed as a multisensor adapted to measure at one and the same time both linear acceleration components and angular velocities in said axes 2 and 3.

7. A multisensor according to claim 6 fitted with a first deflector assembly at one end dedicated to measuring linear acceleration, and with a second deflector assembly at the opposite end dedicated to measuring angular velocities.

8. A multisensor according to claim 7, wherein the deflector assembly dedicated to measuring linear acceleration is type (i).

9. A multisensor according to claim 7, wherein the deflector assembly dedicated to measuring linear acceleration is type (ii).

10. A multisensor according to claim 6, comprising one single deflector assembly type (ii) with one single inertia rotor, designed for measuring both the linear acceleration components and the angular rate in said axes 2 and 3.

11. A multisensor according to claim 10, wherein both the inertia rotor and flexure shaft are asymmetric and the performance of the deflector shaft is governed by the following algorithmic expressions:

$$\theta_2 = -\alpha_1\omega_3 + a_2a_2 \cos (2nt) - a_3a_3 \sin (2nt)$$

$$\theta_3 = \alpha_1\omega_2 + a_2a_3 \cos (2nt) + a_3a_2 \sin (2nt)$$

where $\alpha_1$, $\alpha_2$ and $\alpha_3$ are constants depending on the rotary inertia properties, $a_2$ and $a_3$ are the acceleration components at the two mutually perpendicular axes 2 and 3, $\omega_2$ and $\omega_3$ are the angular velocities in the axes 2 and 3, n is the motor speed, and $\theta_2$, $\theta_3$ are the angular deflections of the inertia rotor in axes 2 and 3; and said processor means are designed to resolve these algorithmic expressions.

12. A multisensor according to claim 10, wherein the inertia rotor is symmetric and the flexure shaft is asymmetric, the performance of the deflector shaft is expressed by the algorithmic expressions:

$$\theta_2 = -\alpha_1\omega_3 + a_2a_2 + (a_3\omega_3 + a_4a_2) \cos (2nt) - (a_3\omega_2 + a_4a_3) \sin (2nt)$$

$$\theta_3 = \alpha_1\omega_2 - a_2a_3 + (a_3\omega_2 + a_4a_3) \cos (2nt) + (a_3\omega_3 + a_4a_2) \sin (2nt)$$

where $\alpha_1$, $\alpha_2$, $\alpha_3$ and $\alpha_4$ are constants depending on the rotary inertia properties, the flexure shaft constants and the position of the rotor center of mass and $a_2$, $a_3$, $\omega_2$, $\omega_3$, n and $\theta_2$, $\theta_3$ are as in claim 10 and said processor means are designed to resolve these algorithmic expressions.

13. A multisensor inertial measurement unit comprising three sensors that are "degenerated" multisensors according to claim 6 which sense indiscriminantly linear accelerations and angular rates.

14. A multisensor inertial measurement unit comprising three sensors that are "degenerated" multisensors according to claim 7 which sense indiscriminantly linear accelerations and angular rates.

15. A multisensor inertial measurement unit comprising three sensors that are "degenerated" multisensors according to claim 8 which sense indiscriminantly linear accelerations and angular rates.

16. A multisensor inertial measurement unit comprising three sensors that are "degenerated" multisensors according to claim 9 which sense indiscriminantly linear accelerations and angular rates.

17. A multisensor inertial measurement unit comprising three sensors that are "degenerated" multisensors according to claim 10 which sense indiscriminantly linear accelerations and angular rates.

18. A multisensor inertial measurement unit comprising three sensors that are "degenerated" multisensors according to claim 11 which sense indiscriminantly linear accelerations and angular rates.

19. A multisensor inertial measurement unit comprising three sensors that are "degenerated" multisensors according to claim 12 which sense indiscriminantly linear accelerations and angular rates.

* * * * *